United States Patent
Barua et al.

(10) Patent No.: US 8,644,983 B1
(45) Date of Patent: Feb. 4, 2014

(54) ORDER FULFILLMENT LOGISTICS WORKFLOW

(75) Inventors: Abhik Barua, Overland Park, KS (US); Deandra T. Cassone, Overland Park, KS (US); Richard Motilal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1040 days.

(21) Appl. No.: 12/697,981

(22) Filed: Feb. 1, 2010

(51) Int. Cl.
*G06F 7/00* (2006.01)

(52) U.S. Cl.
USPC .......................................... 700/216; 700/230

(58) Field of Classification Search
USPC ................................................. 700/216, 230
See application file for complete search history.

(56) References Cited

U.S. PATENT DOCUMENTS

| | | | |
|---|---|---|---|
| 5,395,206 A * | 3/1995 | Cerny, Jr. ...................... 414/807 |
| 5,797,101 A | 8/1998 | Osmani et al. |
| 5,943,841 A * | 8/1999 | Wunscher ...................... 53/154 |
| 7,937,751 B2 | 5/2011 | Tom |
| 7,991,505 B2 * | 8/2011 | Lert et al. ...................... 700/214 |
| 8,032,115 B1 | 10/2011 | Breau et al. |
| 8,380,585 B2 | 2/2013 | Barua et al. |
| 8,494,673 B2 * | 7/2013 | Miranda et al. ............... 700/216 |
| 2001/0041947 A1 * | 11/2001 | Patil et al. .................... 700/216 |
| 2005/0059430 A1 | 3/2005 | Beeman et al. |
| 2008/0132203 A1 | 6/2008 | Whittington et al. |
| 2011/0191199 A1 | 8/2011 | Barua et al. |

OTHER PUBLICATIONS

FAIPP Pre-Interview Communication dated Jul. 10, 2012, U.S. Appl. No. 12/698,714, filed Feb. 2, 2010.
Notice of Allowance dated Oct. 10, 2012, U.S. Appl. No. 12/698,714, filed Feb. 2, 2010.

* cited by examiner

*Primary Examiner* — Ramya Burgess

(57) ABSTRACT

An order fulfillment system is provided. The system comprises logistics substations comprising an entry and exit points. The system also comprises conveyors that adaptively couple the logistics substations in a serialized order fulfillment logistics workflow to convey an order from a selected one of the entry points of one of the logistics substations to a selected plurality of logistics substations where order fulfillment procedures are performed on the order and to a selected one of the exit points of one of the logistics substations. The system also comprises a computer system that receives batches of orders, that analyzes a trend of orders, that analyzes a current inventory, that analyzes a current topology of the serialized fulfillment logistics workflow, and that changes the topology of the serialized fulfillment logistics workflow by commanding the plurality of conveyors to change their coupling of the logistics substations, based on the analysis.

16 Claims, 6 Drawing Sheets

ORDER FULFILLMENT LOGISTICS WORKFLOW

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Order fulfillment for large businesses may involve sophisticated logistics procedures and systems that are composed of state-of-the-art computers and processing apparatus. Many different considerations may be involved including providing timely fulfillment of orders to customers as well as efficient, economic operation of distribution facilities.

SUMMARY

In an embodiment, an order fulfillment system is disclosed. The system comprises logistics substations, each logistics substation comprising an entry and exit points and providing at least one of a customized and an automated order fulfillment operation. The system also comprises conveyors that adaptively couple at least some of the logistics substations in a serialized order fulfillment logistics workflow to convey an order from a selected one of the entry points of one of the logistics substations to a selected plurality of logistics substations where order fulfillment procedures are performed on the order and to a selected one of the exit points of one of the logistics substations. The system also comprises a computer system that receives batches of orders, that analyzes a trend of orders, that analyzes a current inventory, that analyzes a current topology of the serialized fulfillment logistics workflow, and that changes the topology of the serialized fulfillment logistics workflow by commanding the plurality of conveyors to change their coupling of the logistics substations, based on the analysis, whereby the fulfillment of orders achieves service level agreements associated with the orders.

In another embodiment, a method of order fulfillment is disclosed. The method comprises a computer system analyzing a plurality of orders for different products associated with different serialized order fulfillment logistics workflows. The method also comprises the computer system performing a non-linear optimization to identify a topology of an adaptable network of conveyors that couple a plurality of logistics substations, wherein the identified achieves service level agreements associated with the orders. The method also comprises the computer system commanding the adaptable network of conveyors to couple the plurality of logistics substations according to the identified topology. The method also comprises introducing products associated with the orders at a first entry point of one of the logistics substations and shipping fulfilled orders received at a first exit point of one of the logistics substations.

In another embodiment, a method of order fulfillment is provided. The method comprises a computer system receiving a plurality of orders for different products, the different products associated with different serialized order fulfillment logistics workflows. The method also comprises the computer system analyzing the plurality of orders and a first topology of an adaptable network of conveyors that couple a plurality of logistics substations to define a first logistics workflow, wherein the logistics substations comprise at least an entry point, an exit point and provide at least one of a customized order fulfillment operation and an automated order fulfillment operation. The method also comprises the computer system predicting future orders for different products. The method also comprises the computer system identifying a second topology of the adaptable network of conveyors that couples the plurality of logistics substations to define a second logistics workflow based on the predicted future orders, based on the analysis of the orders, and based on the analysis of the first topology, wherein the second topology is different from the first topology. The method also comprises the computer system commanding the adaptable network of conveyors to change from the first topology to the second topology.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
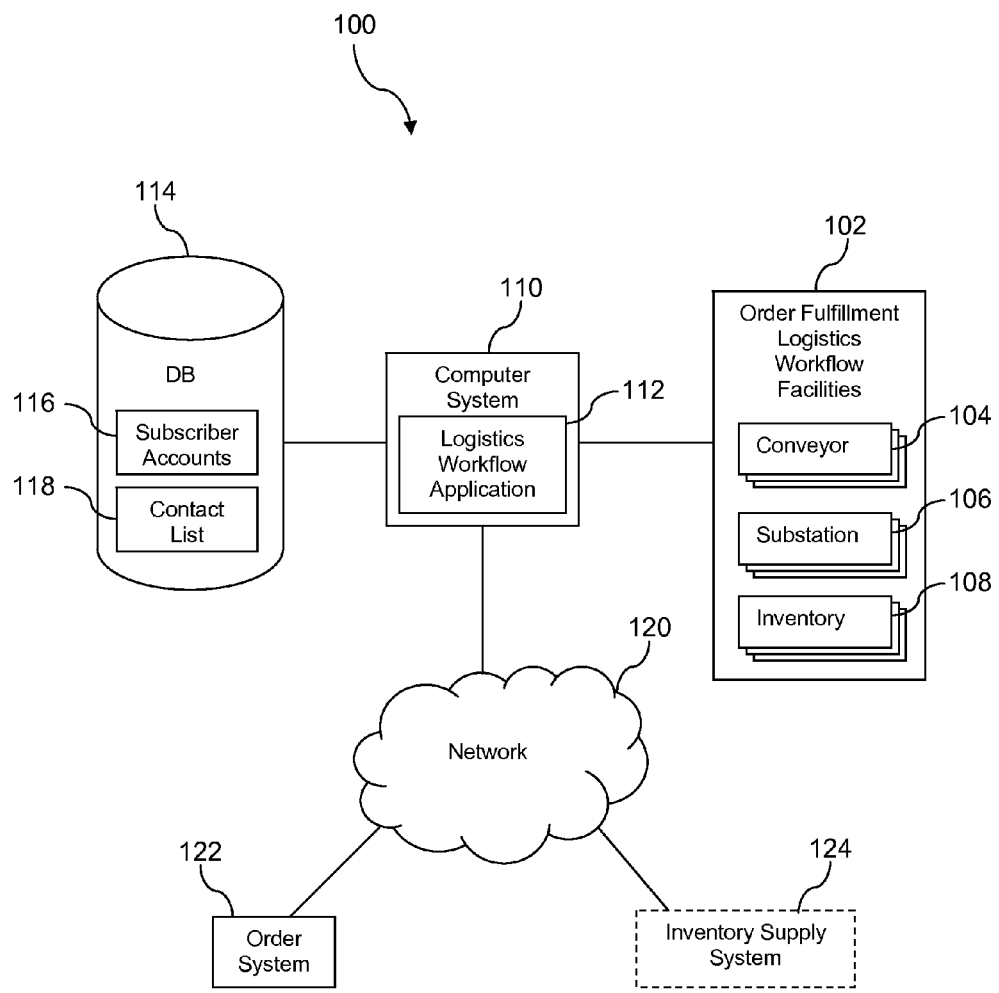
FIG. 1 is a block diagram of a logistics workflow system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An adaptable logistics workflow system is taught in the present disclosure. In an embodiment, the logistics workflow is a wireless communication device order fulfillment system, but in other embodiments the logistics workflow may relate to order fulfillment systems for other types of devices and/or for other logistics procedures. In an embodiment, an order fulfillment system handles a large volume of serialized orders in a flexible, adaptable manner to achieve service level agreements efficiently. In an embodiment, the order fulfillment system may handle hundreds of different types of serialized orders, for example serialized orders for tens or even hundreds of different wireless device models. In an embodiment, fulfilling a serialized order may entail associating a serial number of an electronic device, such as an electronic serial number (ESN) and/or a mobile station identity (MSID) of a mobile phone, to a specific order and/or to a specific shipment package and/or tracking the shipment of the electronic device based on this serial number to its destination. Some federal communication commission (FCC) regulations may place an obligation on communication equipment manufacturers, retailers, and communication service providers to be able to account for all wireless communication devices by their serial numbers. Fulfilling a serialized order may further entail associating a serial number of the electronic device to a wireless communication subscription account, for example a wireless communication subscription account associated with a user, and to network access authorization functions for the user.

In an embodiment of the adaptable logistics workflow system, a computer system executes non-linear optimization algorithms to analyze current inventories of wireless communication devices, to analyze current orders for wireless communication devices, to analyze a current topology of an adaptable network of conveyors coupling a plurality of logistics substations and determines a changed topology of the adaptable network of conveyors coupling the logistics substations to better perform order fulfillment tasks. Unlike known logistics workflow systems, in an embodiment, the adaptable logistics workflow system taught by the present disclosure may be analyzed and adapted or changed dynamically on short time frames. For example, in an embodiment, the adaptable network of conveyors may be changed to adapt to an order fulfillment scenario on a first day and changed again to adapt to a different order fulfillment scenario on the next succeeding day.

In order to promote flexibility and adaptability, the logistics workflows have been broken into finer granularity tasks than has been traditional, and logistics substations are designed to include redundant capabilities. The logistics workflow lines composed of the adaptable conveyors coupling logistics substations are structured with multiple entry points and multiple exit points to support greater flexibility and adaptability. Each logistics substation comprises at least one entry point and at least one exit point. Inventory is placed proximate to appropriate entry points and may be moved as the topology of the adaptable network of conveyors is changed and/or as the book of orders changes to improve the logistics workflow.

Turning now to FIG. 1, a logistics workflow system 100 is described. In an embodiment, discussed in some detail below, the logistics workflow system 100 may be a wireless communication device order fulfillment system, but in other embodiments the logistics workflow system 100 may implement other types of order fulfillment systems and/or other logistics workflows. In an embodiment, the system 100 comprises order fulfillment logistics workflow facilities 102 which may comprise a plurality of conveyors 104, a plurality of substations 106, and an inventory of a plurality of different types of devices 108. The facilities 102 are communicatively coupled with a computer system 110 that executes a logistics workflow application 112. The computer system 110 commands the operation of the facilities 102 based on executing the logistics workflow application 112. The computer system 110 is coupled to a data store 114 that comprises subscriber account information 116 and optionally contains contact lists 118. The computer system 110 may communicate via a network 120 with an order system 122 and an inventory supply system 124. The network 120 may be a local area network (LAN), the Internet, or some other communications network.

In an embodiment, the system 100 provides fulfillment of serialized equipment orders. As used herein, the term serialized equipment order and/or serialized order is used to indicate that, at least at some point during the order fulfillment process, the subject order is bound and/or linked to a serialized piece of equipment. For example, but not by way of limitation, during the process of fulfilling an order for a mobile phone, a serial number attaching to the mobile phone is bound to a wireless communication subscriber account. After this point in the order fulfillment process, the specific serial number may be used to provision authentication of the mobile phone into a wireless communication network and to bill services to the subject wireless communication subscriber account. After this point in the order fulfillment process, unlike fulfilling a non-serialized order, for example, for a pair of size 13 running shoes, another instance of the same mobile phone model may not be simply substituted for the bound mobile phone. For example, if the bound mobile phone should be damaged during the fulfillment process after the binding of serial number to the wireless communication subscriber account, rather than merely swapping the damaged mobile phone with an undamaged mobile phone of the same model, the damaged mobile phone would first be unbound from the wireless communication subscriber account, the undamaged mobile phone would then be bound to the wireless communication subscriber account, and the remaining steps of the subject order fulfillment process would be completed. While the binding of a mobile phone with a wireless communication subscription account has been described above, it is understood that order fulfillment for other types of electronic equipment and/or other products may likewise be serialized in a similar way.

The computer system 110 may be implemented as a single computer, by a plurality of computers, and/or in part by a cloud computing infrastructure. Computer systems are described in more detail hereinafter. The computer system 110 may provide a distributed solution wherein a plurality of computers may perform portions of the functionality described below as performed by the logistics workflow application 112 executing on the computer system 110. For example, some computers forming parts of the computer system 110 may be located proximate to individual substations 106 of the order fulfillment logistics workflow facilities 102 and operate in the role of substation controllers and/or cell controllers. Such substation controllers may control the functionality of substations 106 based on messages and/or commands received from a central coordinating computer and/or controller. Other computers located within the order fulfillment logistics workflow facilities 102, likewise, may perform specialized and/or limited functions, at least in part responsive to messages and/or commands received from a central coordinating computer and/or controller.

The orders provided by the order system 122 may be batched into a plurality of orders and sent to the computer system 110 via the network 120 periodically or as a threshold number of orders have accumulated. In an embodiment, the orders may be prioritized in some manner. In an embodiment, the orders may be received by the order system 122 from a plurality of order sub-systems (not shown). The orders may specify a service level agreement (SLA) defining a customer expectation for delivery of the ordered product. The orders may specify a plurality of items, a number of each item, a delivery location for portions of the order, and other information. For example, a business may place an order for 800 units with 100 units to be delivered to building A, 400 units to be delivered to building B, and 300 units to be delivered to building C.

In an embodiment, the orders may be segregated into direct-to-consumer type orders, direct-to-business type orders, retail type orders, and government type orders. In an embodiment, the direct-to-consumer type orders may comprise, for example, an order by an individual for a single mobile phone. In an embodiment, the direct-to-business type orders may comprise, for example, an order by a business for a plurality of mobile phones, perhaps of different types of mobile phones. In an embodiment, the retail type orders may comprise, for example, an order from a retail outlet of a wireless communication service provider for a plurality of mobile phones of different types. In an embodiment, the government type orders may comprise, for example, an order from a government office for a plurality of phones for government employees to use during the course of their government employment activities. In an embodiment, the order fulfillment logistics workflow facilities 102 may be adapted to optimize order fulfillment for the several different order fulfillment types. For example, the order fulfillment logistics workflow facilities 102 may configure a separate line for fulfillment of each different type of order fulfillment. Responsive to predicted order fulfillment workflows, the logistics workflow application 112 may command the order fulfillment logistics workflow facilities 102 to alter the topology of the coupling of the substations 106 by the conveyors 104 to better support the predicted order fulfillment workflow, for example by combining order fulfillment of two different order fulfillment types that initially are completed on two separate lines on a single line while dedicating a second and a third line to order fulfillment of a third order fulfillment type.

The inventory supply system 124 may comprise a single system or a plurality of systems that send messages to the logistics workflow application 112 about items or products shipping to the order fulfillment logistics workflow facilities 102, for example to a central distribution center. The inventory supply system 124 may receive reports from vendors detailing product shipment plans, for example advance shipping notifications (ASNs).

The conveyors 104 comprise material conveying apparatus to move product and other items within the order fulfillment logistics workflow facilities 102 and among substations 106. One of the substations 106 may provide a variety of different functionality. For example, one the substations 106 may comprise a plurality of machines to build boxes, to print labels, to adhere labels to boxes, to pick product from stocking shelves and place in a box, to insert printed materials such as user manuals and other printed materials into the box, to print notices such as a notice that a phone charger is not currently in stock and will be shipped separately at no additional cost in two days, and other machines. Some substations 106 may comprise stations where physical cabling is coupled to a product to power on and provision an electronic device. For example, in an embodiment, one of the substations 106 may comprise a computer terminal that can be coupled to a mobile phone to provision information into the mobile phone such as commonly shared business contacts for mobile phones ordered by a sales department of an organization. Some substations 106 may be used to disable selected functions of the mobile phones, for example to disable a camera function of the mobile phone or to exercise an audio recorder function of the mobile phone. Some substations 106 may comprise stations which communicate with an electronic product, for example a mobile phone, via wireless communication to provision the electronic product over-the-air. Some of the stations within the substations 106 may be fully automated while other stations within the substations 106 may provide customization procedures conducted at least in part by human operators, perhaps assisted by a computer.

To promote the flexibility and adaptability of the order fulfillment logistics workflow facilities 102, the different types of stations may be located in a plurality of substations 106. For example, label printing stations may not be concentrated primarily in one area but may be widely distributed to promote reconfiguring the lines to support different order fulfillment loads. The componentization of the logistics workflows into processing steps associated with substations 106 and stations within the substations 106 as well as the numbers and kinds of conveyors 104 may be determined based on management level order fulfillment operating criteria. For example, the weight assigned by management to independent operating criteria of capacity, cost, flexibility, location, and performance may drive the processes of initial set-up of the order fulfillment logistics workflow facilities 102, with reference to numbers of conveyors 104, numbers of substations 106, and the numbers and types of stations within the substations 106.

The logistics workflow system 100 may support a large daily volume of order fulfillment, for example more than 200,000 mobile phones per day. In an embodiment, the logistics workflow system 100 may support order fulfillment for hundreds of different models of electronic devices, for example more than 400 hundred different mobile phone models. The number of orders for specific popular electronic device models may be substantially higher than the number of orders for other electronic device models. The ratios between numbers of orders for different electronic device models may change over time, based on marketing promotions, general business conditions, and other conditions. The distribution of orders among direct-to-customer type orders, direct-to-business type orders, retail type orders, and government type orders may change substantially over time.

These variations suggest that any fixed configuration of the order fulfillment logistics workflow facilities 102, for example a fixed topology of the conveyors 104 coupling the substations 106 into order fulfillment lines, may be far from optimal for much of the time. In many prior art systems, the topology of order fulfillment lines are not changed unless the change is driven by conditions that are expected to prevail for months at a time. The order fulfillment logistics workflow facilities 102 taught by the present disclosure, under the control of the logistics workflow application 112, is able to analyze the changing book of orders, determine an approximately optimized topology and/or configuration of the order fulfillment logistics workflow facilities, and adapt the coupling of substations 106 by the conveyors 104 for as little as 500 units and multiple times per day.

In an embodiment, the logistics workflow application 112 may employ simulation techniques in combination with non-linear optimization techniques such as a Hooke-Jeeves non-linear optimization algorithm and/or a geometric non-linear optimization algorithm, to determine a near optimal topology and/or configuration of the order fulfillment logistics workflow facilities 102, for example a specific topology of conveyors 104 coupling together the substations 106. In an embodiment, the logistics workflow application 112 analyzes the multi-modal decision space of how to optimally configure the order fulfillment logistics workflow facilities 102 using search techniques integrated with the simulation of the order fulfillment logistics workflow facilities 102. Some of the optimization constraints may include different service level agreements specifying a turnaround time on fulfilling different orders, maximizing order fulfillment throughput, minimizing order fulfillment costs, and other constraints. As used in some contexts herein, the term optimization does not refer to the best possible solution to a specific problem but instead to a preferred solution to the specific problem subject to the constraints of the processor resources of the computer system 110 and the need to make a decision dynamically.

Figure 2:
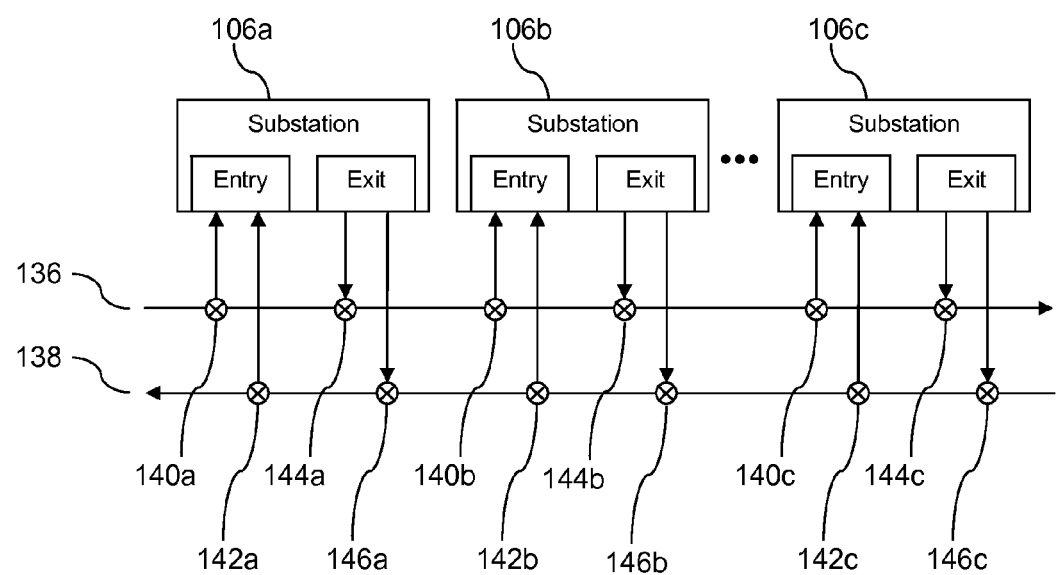
FIG. 2 is a block diagram of an adaptable conveyor network coupling logistics substations according to an embodiment of the disclosure.

Turning now to FIG. 2, an exemplary coupling of substations 106 by conveyors 104 is discussed. A first conveyor 136 moves material from left to right and a second conveyor 138 moves material from right to left. Computer controllable material handling switches 140, 142, 144, and 146 may be commanded by the logistics workflow application 112 executing on the computer system 110 and/or by cell controllers proximate to the substations 106, to direct material passing on the first and second conveyors 136, 138 to enter and/or leave the substation 106. For example, a first material handling switch 140a of the first substation 106a may direct material from the first conveyor 136 into the entry point of the first substation 106a for processing. A second material handling switch 144a may return the material from the exit point of the first substation 106a to the first conveyor 136 to continue conveyance rightwards to a second substation 106b for further processing.

Alternatively, a third material handling switch 142a of the first substation 106a may direct material from the second conveyor 138 into the entry point of the first substation 106a. Alternatively, a fourth material handling switch 146a may return the material from the exit point of the first substation 106a to the second conveyor 138. It is understood that other combinations of the selection of the material handling switches 140, 142, 144, and 146 are possible. For example, both the first material handling switch 140a and the third material handling switch 142a may concurrently direct material from the first and second conveyors 136, 138, respectively, into the entry point of the first substation 106a. It will be appreciated that by properly selecting the state of the material handling switches 140, 142, 144, and 146 that many different configurations of the order fulfillment logistics facilities 102 are possible.

The order fulfillment logistics workflow facilities 102 promote flexible adaptation of the coupling of substations 106 by conveyors 104. For example, in an embodiment, the substation 106b may provide processing to box mobile phones individually to fulfill direct-to-consumer type orders and the substation 106c may provide processing to package bulk orders of mobile phones to fulfill direct-to-business type orders. During a first part of a week, when direct-to-consumer type orders are being fulfilled, the first material handling switch 140b may be enabled to divert orders off the first conveyor 136 into the second substation 106b for individual boxing of the mobile phones for direct-to-consumer type orders and the second material handling switch 144b may be enabled to return the boxed direct-to-consumer type orders to the first conveyor 136 to be conveyed to other substations 106 for further processing and/or for conveyance to a shipping staging area. For this first part of the week, the first material handling switch 140c may be disabled so orders on the first conveyor 136 continue past the third substation 106c without being diverted into the third substation 106c for processing. During a second part of the week, when direct-to-business type orders are being fulfilled, the first material handling switch 140c may be enabled to divert orders off the first conveyor 136 into the third substation 106c for packaging of a plurality of mobile phones for direct-to-business type orders and the second material handling switch 144c may be enabled to return the packaged direct-to-business type orders to the first conveyor 136 to be conveyed to other substations 106 for further processing and/or for conveyance to a shipping staging area. During the second part of the week, the first material handling switch 140b may be disabled so orders on the first conveyor 136 continue past the second substation 106b without being diverted into the second substation 106b for processing.

It is contemplated that coupling among the substations 106 and conveyors 104 may be adapted and changed in this as well as in other fashions. For example, the conveyors 104 may be commanded to move to establish an identified workflow topology different from an existing workflow topology. Electro-mechanical actuators may be commanded by the computer system 110 and/or by cell controllers coupled to the substations 106 to move the conveyors 104. Moving the conveyors 104 may entail moving a delivery end of the conveyor 104 to relocate delivery of in-progress orders from a first end point to second end point. Moving the conveyors 104 may entail moving a receiving end of the conveyor 104 to relocate initial reception from a third receiving point to a fourth receiving point. Moving the conveyors 104 may entail moving both the receiving and delivery ends of a conveyor to both a different receiving point and a different delivery point. To establish the identified topology, some conveyors 104 may remain in their previous positions while other conveyors 104 may move to couple and/or link different substations 106 and/or different lines. In some cases, the one or more substations 106, automated stations 150 (to be discussed below), and/or customizing stations 152 (to be discussed below), likewise, may be moved to establish the identified topology. For example, establishing the identified topology may entail reducing the number of box building stations 150 in a first substation 106 and increasing the number of box building stations 150 in a second substation 106, which may be accomplished by moving one or more box building stations 150 from the first substation 106 to the second substation 106.

In some cases, the fulfillment logistics workflow facilities 102 may establish and/or configure a line where a link between conveyors 104 and/or substations 106 may be provided manually, for example by distribution center personnel and/or vehicles. For example, the first conveyor 136 may terminate in a staging area where direct-to-business orders are dropped off of the first conveyor 136. The direct-to-business orders may be stacked on pallets by distribution center personnel, the pallets may be moved by a fork-lift operator to another conveyor 104, and transferred from the pallets onto the conveyor 104 by distribution center personnel for further order fulfillment processing on that conveyor 104.

Figure 3:
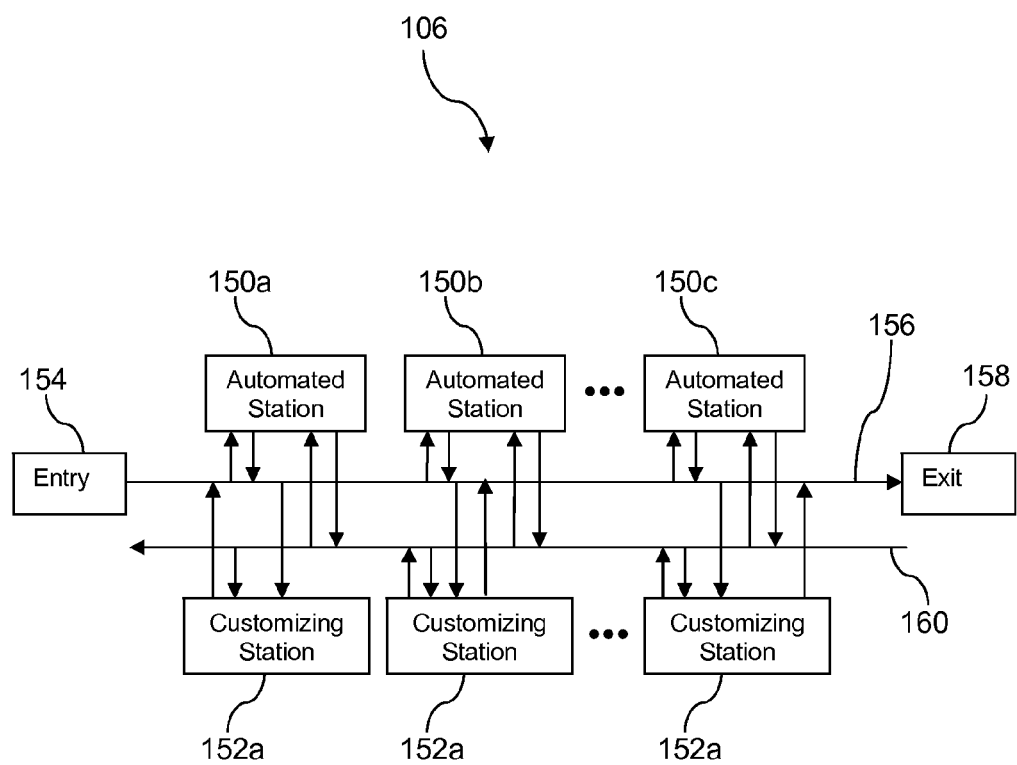
FIG. 3 is a block diagram of a logistics substation according to an embodiment of the disclosure.

Turning now to FIG. 3, an example of a substation 106 is described. In some contexts, the substation 106 may be referred to as a logistics substation. The substation 106 comprises at least one entry point 154 and at least one exit point 158, although in some embodiments multiple entry points 154 and/or multiple exit points 158 may be employed. In an embodiment, the substation 106 may comprise one or more automated stations 150 and one or more customizing stations 152. The flow of material from the entry point 154 to the exit point 158 may follow a variety of paths among the automated stations and/or customizing stations. The substation 106 may comprise a conveyor 156 that flows material generally from the entry point 154 to the exit point 158 and a conveyor 160 that flows material generally from the exit point 158 towards the entry point 154.

Figure 4:
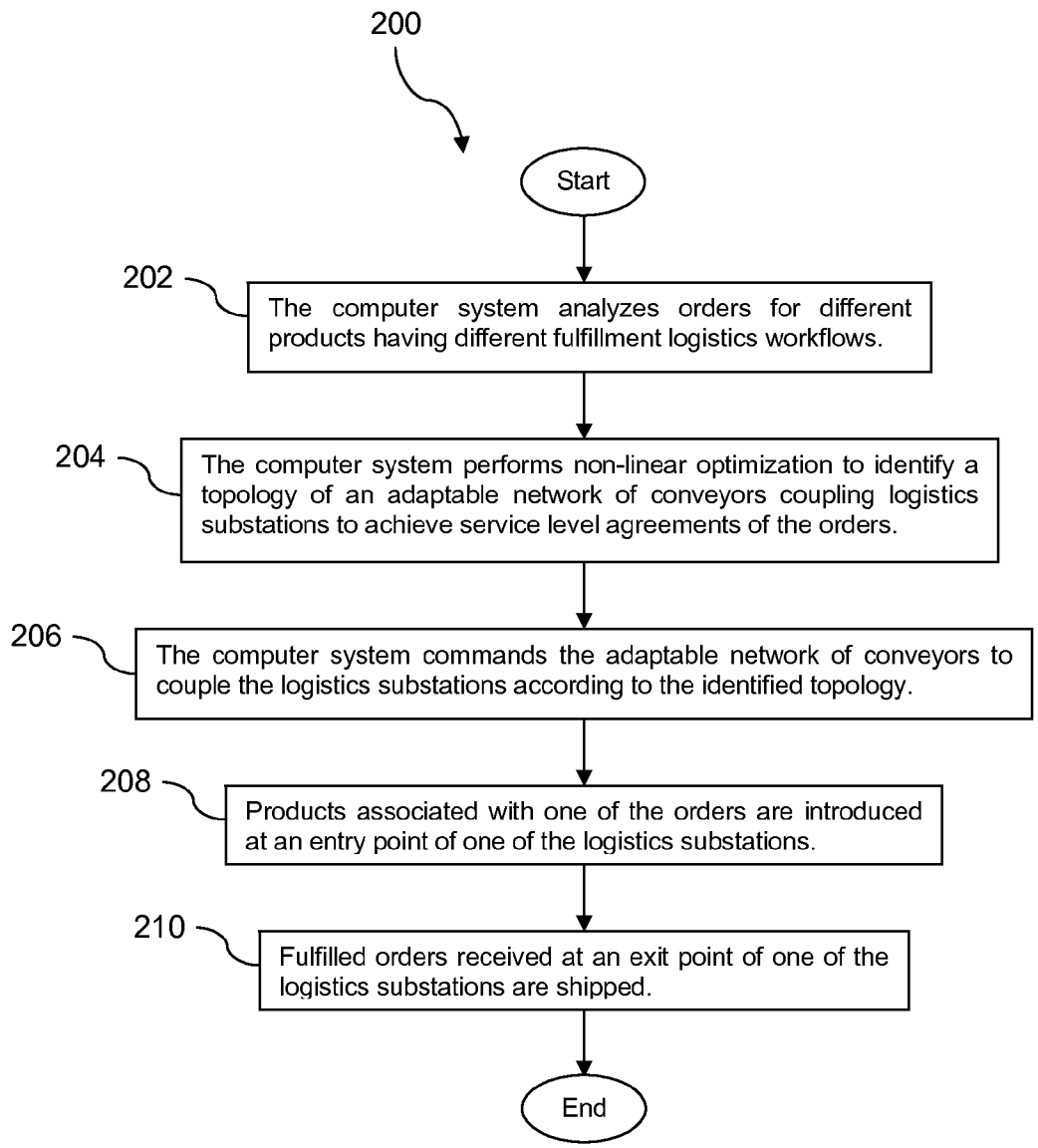
FIG. 4 is an illustration of an order fulfillment method according to an embodiment of the disclosure.

Turning now to FIG. 4, a method 200 is described. At block 202, the computer system 110 analyzes orders for different products having different logistics workflows. For example, the logistics workflow application 112 executing on the computer system 110 analyzes orders that have different fulfillment steps associated with at least some of the orders. For example, a first order may involve loading a data set defining business contacts for an address book feature of a mobile phone while a second order may involve disabling a camera feature of a mobile phone. As another example, a third order may involve 800 mobile phones which are to be segregated for separate deliveries as 100 mobile phones to building A, 400 mobile phones to building B, and 300 mobile phones to building C.

At block 204, the computer system 110 performs non-linear optimization to identify a topology of the network of conveyors 104 coupling the substations 106 to achieve service level agreements. In an embodiment, the processing of block 204 may be performed by the logistics workflow application 112 executing on the computer system 110. The non-linear optimization may be performed subject to a plurality of constraints including maximizing throughput, minimizing cost, minimizing processing time, and other constraints. The non-linear optimization may be performed based on a simulation of the order fulfillment logistics workflow facilities 102. The non-linear optimization may employ a Hooke-Jeeves non-linear optimization algorithm, a geometric non-linear optimization algorithm, or another non-linear optimization algorithm. In an embodiment, the logistics workflow application 112 may analyze a multi-modal decision space associated with configuring the topology of the network of conveyors 104 using search techniques integrated with the simulation of the order fulfillment logistics workflow facilities 102.

At block 206, the computer system 110 commands the adaptable network of conveyors 104 to couple the substations 106 according to the topology identified by the processing of block 204. For example, the conveyors 104 are commanded to move to establish the identified topology. Electro-mechanical actuators may be commanded by the computer system 110 and/or by cell controllers coupled to the substations 106 to move the conveyors 104. Moving the conveyors 104 may entail moving a delivery end of the conveyor 104 to relocate delivery of in-progress orders from a first end point to second end point. Moving the conveyors 104 may entail moving a receiving end of the conveyor 104 to relocate initial reception from a third receiving point to a fourth receiving point. Moving the conveyors 104 may entail moving both the receiving and delivery ends of a conveyor to both a different receiving point and a different delivery point. To establish this topology, some conveyors 104 may remain in their previous positions while other conveyors 104 may move to couple and/or link different substations 106 and/or different lines. In some cases, the one or more substations 106, automated stations 150, and/or customizing stations 152, likewise, may be moved to establish the identified topology. For example, establishing the identified topology may entail reducing the number of box building stations 150 in a first substation 106 and increasing the number of box building stations 150 in a second substation 106, which may be accomplished by moving one or more box building stations 150 from the first substation 106 to the second substation 106. At block 208, products associated with one of the orders are introduced at an entry point at an entry point of one of the substations 106. At block 210, fulfilled orders that are received at an exit point of one of the logistics substations are shipped to a customer.

Figure 5:
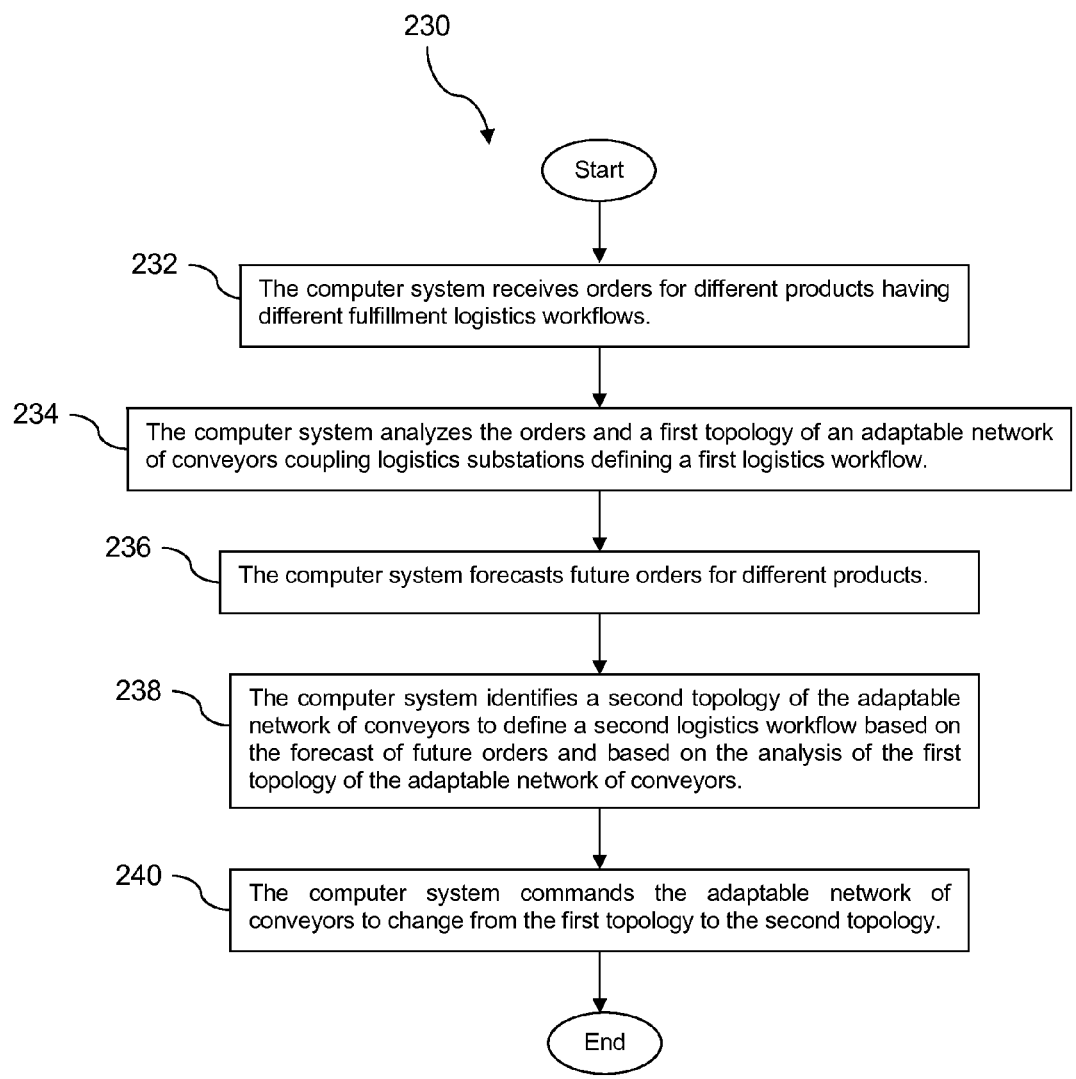
FIG. 5 is an illustration of a method of adapting an order fulfillment system according to an embodiment of the disclosure.

Turning now to FIG. 5, a method 230 is described. At block 232, the computer system 110 receives orders for different products having different fulfillment logistics workflows. For example, the logistics workflow application 112 executing on the computer system 110 receives orders that have different fulfillment steps associated with at least some of the orders. At block 234, the computer system 110 analyzes the orders and analyzes a first topology of an adaptable network of the conveyors 104 that couple the substations 106 to define a first logistics workflow. In an embodiment, the logistics workflow application 112 performs this analysis. In an embodiment, the analysis of the first topology of the adaptable network of the conveyors 104 includes analyzing the functions provided by each of the automated stations 150 and the customizing stations 152 in each of the substations 106 as well as the inventory 108.

At block 236, the computer system 110 forecasts future orders for different products. For example, the logistics workflow application 112 analyzes sales trends, sales projections, planned marketing promotion campaigns, and other information to project a volume of orders for a number of different product models. At block 238, the computer system 110 identifies a second topology of the adaptable network of conveyors 104 to define a second logistics workflow based on the forecast of future orders and based on the analysis of the first topology of the adaptable network of conveyors 104 and based on the forecast of future orders.

At block 240, the computer system 110 commands the adaptable network of conveyors 104 to change from the first topology to the second topology to couple the substations 106. Orders are processed by the order fulfillment logistics workflow facilities 102 configured according to the second topology and are shipped out to customers.

Figure 6:
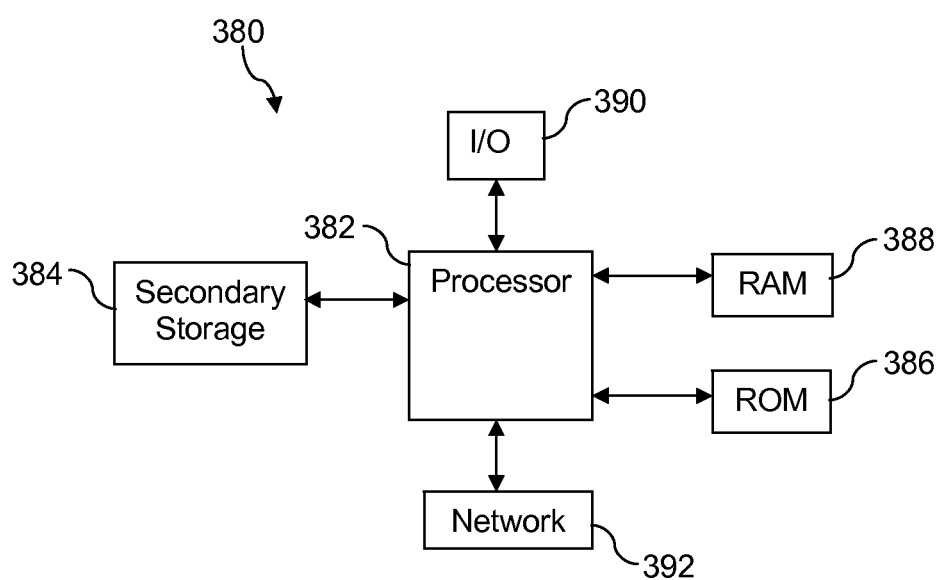
FIG. 6 illustrates an exemplary computer system suitable for implementing the several embodiments of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of order fulfillment, comprising:
analyzing, by a computer system, a plurality of orders for different products associated with different serialized order fulfillment logistics workflows;
performing, by a computer system, a non-linear optimization to identify a topology of an adaptable network of conveyors that couple a plurality of logistics substations, where the identified topology achieves service level agreements associated with the orders;
commanding, by a computer system, the adaptable network of conveyors to couple the plurality of logistics substations according to the identified topology;
introducing products associated with the orders at a first entry point of one of the logistics substations; and
shipping fulfilled orders received at a first exit point of one of the logistics substations.

2. The method of claim 1, wherein the different products comprise different wireless communication devices, and wherein at least one of the substations associates a serial number of the wireless communication device with a wireless communication service subscription account.

3. The method of claim 2, further comprising:
conveying at least some of the wireless communication devices to a provisioning logistics substation; and
provisioning the wireless communication devices with communication parameters at the provisioning logistics substation.

4. The method of claim 3, wherein the communication parameters comprise a plurality of contact entries in a directory of the wireless communication devices.

5. The method of claim 3, wherein the communication parameters comprise disabling at least one of a camera function or a recording function of the wireless communication devices.

6. The method of claim 1, wherein the computer system performs the non-linear optimization based on at least one of grouping orders for shipping to the same state, grouping orders for shipping to the same high order 3 digits of a 5 digit zip-code, grouping orders for shipping to the same 5 digit zip-code, or grouping orders for shipping to the same customer address.

7. The method of claim 1, wherein the computer system performs the non-linear optimization to optimize one of a direct-to-customer order type, a direct-to-business order type, a retail order type, or a government order type.

8. The method of claim 1, wherein each of the plurality of logical substations comprises at least an entry point and an exit point and provides at least one of a customized order fulfillment operation or an automated order fulfillment operation.

9. The method of claim 7, further comprising:
predicting, by a computer system, future orders for different products;
identifying, by a computer system, a second topology of the adaptable network of conveyors that couples the plurality of logistics substations to define a second logistics workflow based on the predicted future orders, based on the analysis of the plurality of orders, and based on an analysis of the topology, wherein the second topology is different from the topology; and
commanding, by a computer system, the adaptable network of conveyors to change from the topology to the second topology.

10. The method of claim 9, further comprising the adaptable network of conveyors changing from the topology to the second topology, wherein the changing from the topology to the second topology is accomplished by at least one of enabling a material handling switch to divert an in-process order from a conveyor into a logistics substation for processing, enabling a material handling switch to return an in-process order from a logistics substation to a conveyor, disabling diversion of an in-process order from a conveyor by a material handling switch into a logistics substation, disabling return of an in-process order from a logistics substation by a material handling switch to a conveyor, moving a conveyor, moving a logistics substation, moving an automated station, and moving a customizing station.

11. The method of claim 9, wherein the computer system identifies the second topology based on a predicted number of orders of each of a plurality of different types of orders, and wherein the different types of orders are two or more of a direct-to-consumer order type, a direct-to-business order type, a retail order type, and a government order type.

12. The method of claim 1, wherein the computer system completes the method in less than a twenty-four hour period of time.

13. The method of claim 1, wherein a first provisioning logistics substation of the plurality of logistics substations associates a serial number of a wireless communication device to a wireless communication service account.

14. The method of claim 13, wherein the serial number is an electronic serial number (ESN).

15. The method of claim 13, wherein a second provisioning logistics substation of the plurality of logistics substations subsequent to the first provisioning logistics substation disassociates the serial number of the wireless communication device from the wireless communication service account, whereby a damaged wireless communication device is removed from an order fulfillment workflow.

16. The method of claim 1, wherein at least some of the service level agreement associated with the orders specify a maximum time between order submission by a customer and order delivery to the customer.

* * * * *